US008573106B2

(12) United States Patent
Burton

(10) Patent No.: US 8,573,106 B2
(45) Date of Patent: Nov. 5, 2013

(54) PORTABLE SAWMILL

(76) Inventor: Larry C. Burton, Weir, MS (US)

( * ) Notice: Subject to any disclaimer, the term of this patent is extended or adjusted under 35 U.S.C. 154(b) by 1051 days.

(21) Appl. No.: 12/588,580

(22) Filed: Oct. 20, 2009

(65) Prior Publication Data

US 2010/0180985 A1 Jul. 22, 2010

Related U.S. Application Data

(60) Provisional application No. 61/202,041, filed on Jan. 22, 2009.

(51) Int. Cl.
*B27B 15/02* (2006.01)
*B23D 55/00* (2006.01)

(52) U.S. Cl.
USPC .................... 83/794; 83/795; 83/813; 83/928

(58) Field of Classification Search
USPC ........ 83/795, 794, 801, 816, 425.2, 487, 813, 83/928; 144/376–378
See application file for complete search history.

(56) References Cited

U.S. PATENT DOCUMENTS

| | | | | |
|---|---|---|---|---|
| 3,374,812 | A | 3/1968 | McManama | |
| 3,747,457 | A * | 7/1973 | Thompson | 83/471.2 |
| 4,289,180 | A | 9/1981 | Weinzierl | |
| 4,431,362 | A | 2/1984 | Wech, Jr. et al. | |
| 4,589,320 | A * | 5/1986 | Kaster | 83/794 |
| 4,660,454 | A | 4/1987 | Elsey | |
| 4,930,386 | A | 6/1990 | Laskowski et al. | |
| 5,035,166 | A | 7/1991 | Carlson et al. | |
| 5,213,022 | A | 5/1993 | Elgan | |
| 5,579,671 | A * | 12/1996 | Bowlin | 83/75.5 |
| D381,994 | S | 8/1997 | Weirick | |
| 6,038,954 | A | 3/2000 | Keener | |
| 6,655,429 | B2 * | 12/2003 | Tekulve et al. | 144/378 |
| 6,722,248 | B1 | 4/2004 | Johnston, Sr. | |
| 7,104,174 | B1 * | 9/2006 | Ocsai | 83/321 |
| 7,444,912 | B2 * | 11/2008 | Fenton et al. | 83/425.2 |
| D639,319 | S * | 6/2011 | Dale | D15/127 |
| 2003/0015256 | A1 * | 1/2003 | Quenneville | 144/357 |
| 2003/0024371 | A1 * | 2/2003 | Gibson et al. | 83/795 |

FOREIGN PATENT DOCUMENTS

| | | |
|---|---|---|
| CA | 2301353 | 9/2000 |
| WO | WO 98/23420 | 6/1998 |

OTHER PUBLICATIONS

Website, http://www.timberking.com/index.cfm, printout of TimberKing website home page, two pages printed from the Internet on Sep. 15, 2008.

* cited by examiner

*Primary Examiner* — Omar Flores Sanchez
(74) *Attorney, Agent, or Firm* — Richard C. Litman

(57) ABSTRACT

The portable sawmill is constructed on a frame having a series of mechanisms for loading and manipulating a log thereon and removing boards cut from the log. Powered tines load a log onto a vertically adjustable log deck, the deck including powered mechanisms for turning and securing the log in the desired orientation for cutting. Cuts are made by a horizontally traveling band saw. The saw has no vertical adjustment. Board thickness is determined by the height of the vertically adjustable log deck. Cut boards are removed by a board sweep that pushes the board laterally from the top of the log onto a tray. The saw travels along the tray to push the board longitudinally onto a suitable platform for transport. All of the above mechanisms are controlled hydraulically from a single operator station on the mill, thus freeing the operator from many manual tasks and increasing production.

24 Claims, 12 Drawing Sheets

PORTABLE SAWMILL

CROSS-REFERENCE TO RELATED APPLICATION

This application claims the benefit of U.S. Provisional Patent Application Ser. No. 61/202,041, filed Jan. 22, 2009.

BACKGROUND OF THE INVENTION

1. Field of the Invention

The present invention relates generally to equipment used in the lumbering industry, and more particularly to a portable sawmill having powered or automated means for hoisting a log onto a cutting platform or bed, lifting the log to the desired height and positioning the log for cutting, and removing cut boards from the mill.

2. Description of the Related Art

Portable sawmills are in common use in wooded areas throughout the world. Such portable sawmills are generally constructed on trailer platforms for towing from one location to another as the need arises. Sawmills, portable or otherwise, may employ a number of different saw principles, from circular saws to reciprocating blades to band saws having continuous blades.

The typical portable sawmill incorporates a band saw with the cutting portion of the blade oriented horizontally. However, such mills conventionally adjust the height of the saw mechanism for different cuts, with the log remaining stationary as the boards are cut from the log. Moreover, such conventional mills generally lack any means for loading a log onto the log support bed or platform, or for removing cut materials from the mill. Logs must be loaded by other means, e.g., manually or with a fork lift or other mechanized equipment, and cut boards must be manually removed from the mill. While many such portable mills are advertised as requiring only a single operator, in truth most such mills require at least one assistant to help load logs onto the cutting bed, position the logs properly for cutting, and remove cut boards from the mill, if any reasonably efficient production is to be maintained. A single operator can certainly operate such a mill, but the operator must take the time to load the next log for cutting, remove cut boards from the mill, etc., which greatly reduces production.

The present inventor is aware of various portable sawmills that have been developed in the past. An example of such is found in PCT publication WO 98/23420, published on Jun. 4, 1998. This publication describes (according to the drawings and English abstract) a small mill having the drive motor for the band saw offset from the major axis of the saw wheels to reduce torsional stress on the support rail for the saw.

Thus, a portable sawmill solving the aforementioned problems is desired.

SUMMARY OF THE INVENTION

The portable sawmill structure is built upon a trailer platform for mobility and transport to and from a desired logging or cutting operation. The frame includes two pivotally attached tines for lifting a log from one side of the mill and rolling it onto the log support bed or deck. The tines are articulated to fold adjacent the mill frame side when not in use, to reduce the width of the structure for highway towing. Mechanisms are provided in the log support bed or deck to turn or roll the log to the desired orientation and to secure the log in the desired orientation.

The log deck is lowered to facilitate placement of a log thereon, and raised to the desired height for cutting boards therefrom with a band saw blade. The band saw travels longitudinally to make the desired cuts, but does not adjust vertically; its height is fixed relative to the remainder of the frame with the exception of the vertically adjustable log bed. Thus, the log is raised and lowered to define the thickness of the board to be cut from the log, rather than adjusting the vertical location of the saw.

The above-described system results in the plane of the cut always remaining in the same plane or height, i.e., any cut board remaining atop the log will be located immediately above the same cut plane at all times. This allows for the installation of a board sweep, which is actuated to move the cut board laterally from its position atop the log to a tray disposed along the opposite side of the frame from the log loading tines. The saw motor and other saw mechanism travels directly over this tray, with motion of the saw being used to push cut boards from the tray to a suitable structure (e.g., truck bed, flat bed trailer, etc.) for transport from the logging site.

All of the above-described mechanisms are hydraulically operated from a single location on the mill, enabling a single operator to handle all of the required operations from a single operating station once a log has been placed on the loading tines. The present portable sawmill requires little or no additional manipulation of product by the operator, thus allowing the operator to remain at the operating station to operate the mill without need to take the time to remove product from the mill, etc.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
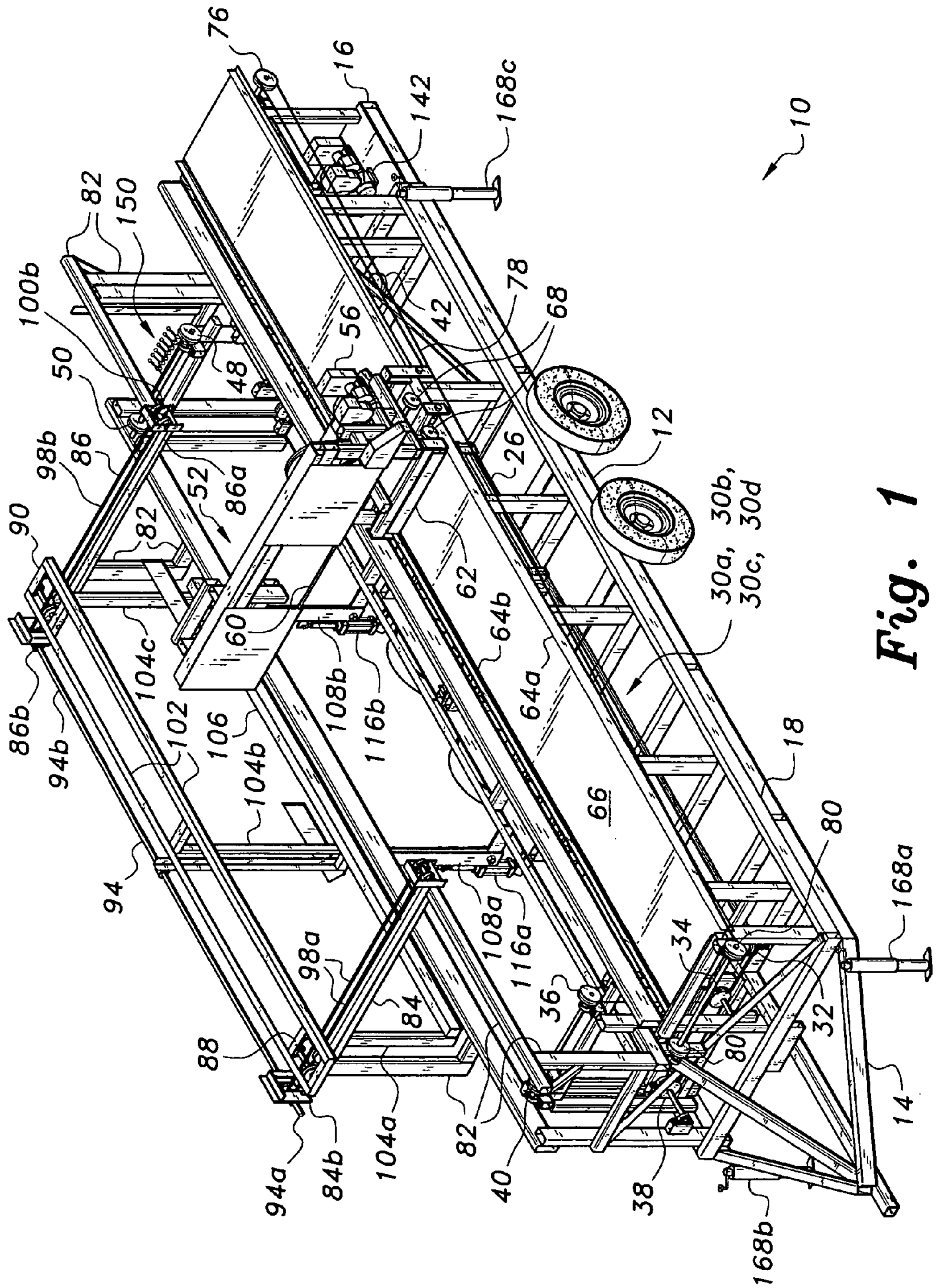
FIG. 1 is a left side, front and top perspective view of a portable sawmill according to the present invention, showing its general features.
Figure 2:
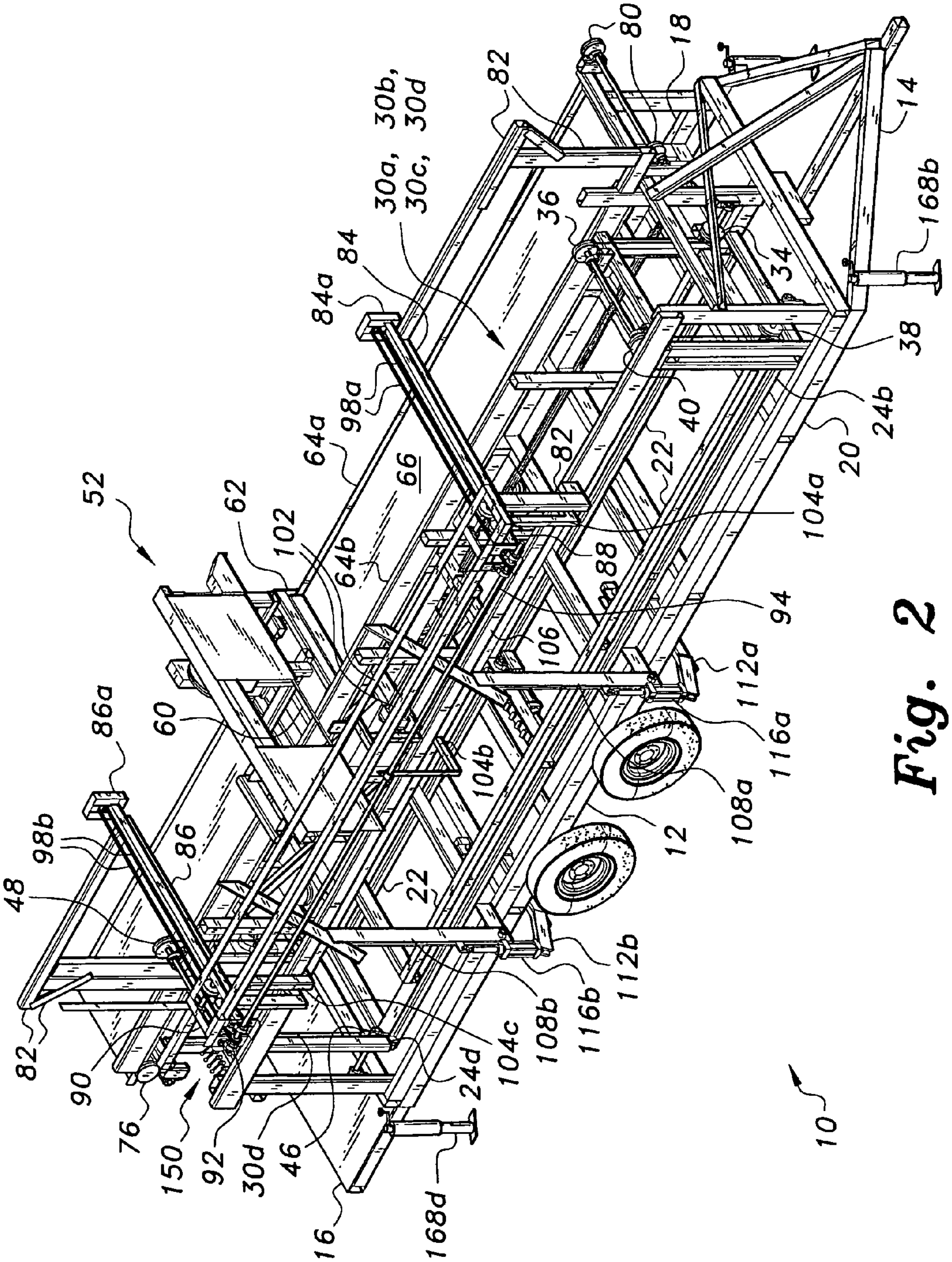
FIG. 2 is a right side, front and top perspective view of the portable sawmill of FIG. 1, showing additional features thereof.
Figure 3:
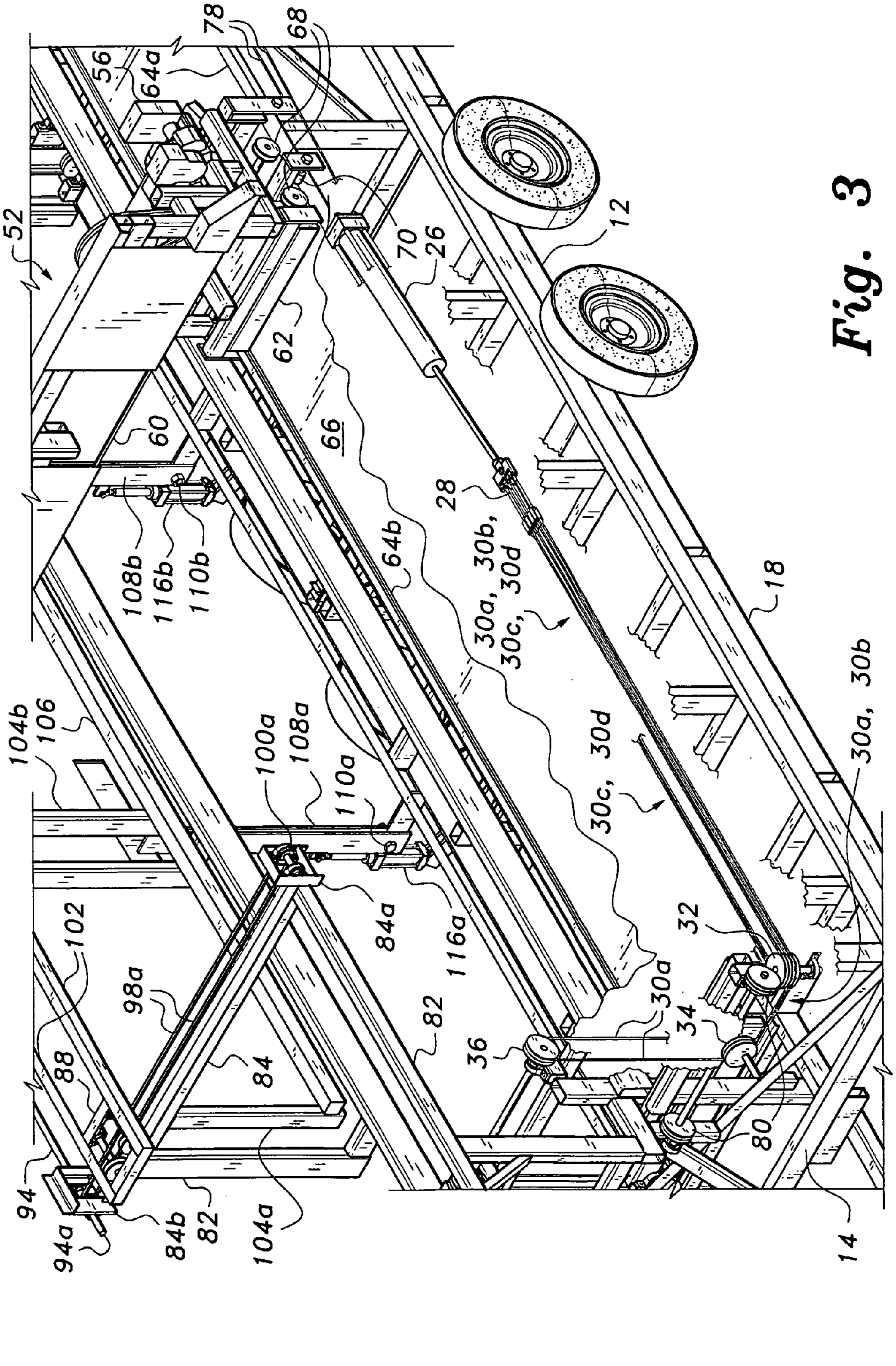
FIG. 3 is a detailed left side, front and top perspective view showing the hydraulically actuated cable system for lifting the log bed, with overlying structure removed for clarity.
Figure 4:
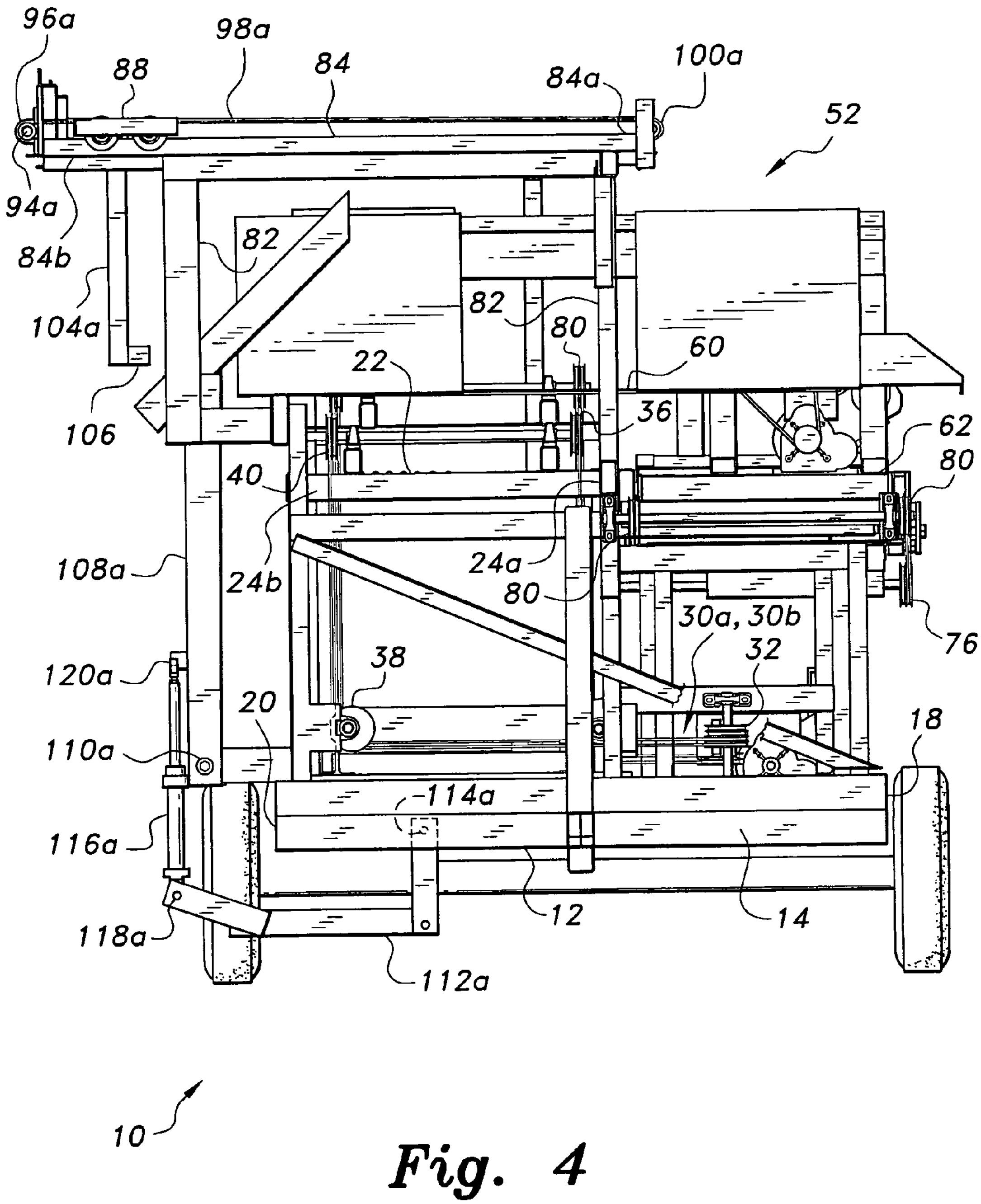
FIG. 4 is a front elevation view of the portable sawmill, showing various details thereof.

The portable sawmill has a number of powered mechanisms installed thereon to permit operation of the sawmill by a single operator. The various powered mechanisms and features are illustrated in corresponding drawing Figs., with FIGS. 1 and 2 providing general views of the sawmill and its features. The portable sawmill 10 is constructed on a trailer frame 12 having a forward or first end 14 with a tongue extending therefrom, a second or rearward end 16 opposite the forward end and including operating controls thereon, a first or left side 18 having a board tray extending therealong, and a second or right side 20 opposite the left side and having a log lifting mechanism and board sweep mechanism extending therefrom.

A vertically adjustable log deck 22 is installed on the frame 12, to the right of center and extending for the majority of the length of the frame. FIGS. 2 through 11 illustrate the log deck 22 or portions thereof, with FIGS. 3 through 6 and FIG. 9 best illustrating the cable lift system used to adjust the height of the log deck. The log deck 22 is a frame structure with a generally rectangular planform having a first or left front corner 24*a*, second or right front corner 24*b*, third or left rear corner 24*c*, and fourth or right rear corner 24*d*. A log deck lift hydraulic strut or cylinder 26 is installed longitudinally and generally medially along the left side of the frame 12 and receives hydraulic pressure for its operation from a hydraulic system, described in detail further below. The log deck lift strut 26 is connected to a bracket and turnbuckle assembly 28, from which a series of four cables 30*a* through 30*d* extend. Each of the cables 30*a* through 30*d* passes around a series of lower and upper pulleys and connects to the corresponding log deck corner 24*a* through 24*d*, with retraction of the strut 26 drawing the cables toward the strut and lifting the log deck 22 by means of the cables wrapping over the upper pulleys and extending downwardly to lift the log deck 22.

Specifically, the four cables 30*a* through 30*d* pass around a four sheave pulley 32 located at the left front corner of the frame 12. The two cables 30*a* and 30*b* turn 90 degrees around the pulley 32 and remain at the forward end of the sawmill structure 10. The first or left front corner cable 30*a* passes around another lower pulley 34 that routes it upwardly to left front corner upper pulley 36, whereupon the cable 30*a* reverses direction to extend downwardly to connect to the left front corner 24*a* of the log lift platform 22. The right front lift cable 30*b* continues past the lower pulley 34 to a lower right front corner pulley 38, passing around this pulley to a right front upper corner pulley 40 whereupon it reverses direction to extend downwardly to connect to the right front corner 24*b* of the log lift deck 22.

The two rear cables 30*c* and 30*d* make a 180 degree bend around the four sheave pulley 32, to extend to a rearwardly disposed two sheave lower pulley 42. At this point, the two rear cables 30*c*, 30*d* extend respectively to left rear and right rear lower pulleys 44 and 46, which guide the cables upwardly to their respective upper rear pulleys. The left rear corner lift cable 30*c* extends upwardly to pass over the upper left rear pulley 48 and back down to connect to the left rear corner 24*c* of the log lift deck 22, with the right rear corner lift cable 30*d* extending upwardly to pass around the upper right rear pulley 50 and back down to connect to the right rear corner 24*d* of the log lift deck.

Thus, when the log deck lift strut 26 is actuated to retract its ram, all four cables 30*a* through 30*d* are pulled around their respective pulleys, ultimately lifting the log lifting deck 22 due to the cables passing around their upper pulleys 36, 40, 48, and 50, respectively located essentially above the four corners 24*a* through 24*d* of the log lifting deck. The cables are always in tension, with the weight of the log lift deck 22 (and any log or other mass that may be resting upon the deck 22) urging the deck downwardly to maintain tension on the cables at all times. Also, while the use of cables and pulleys has been described above in detail as the system for lifting the log deck 22, it should be noted that roller chain and corresponding sprockets, or other flexible tensile members and means for changing their direction of travel, may be used in lieu of the cable and pulley system described.

Figure 5:
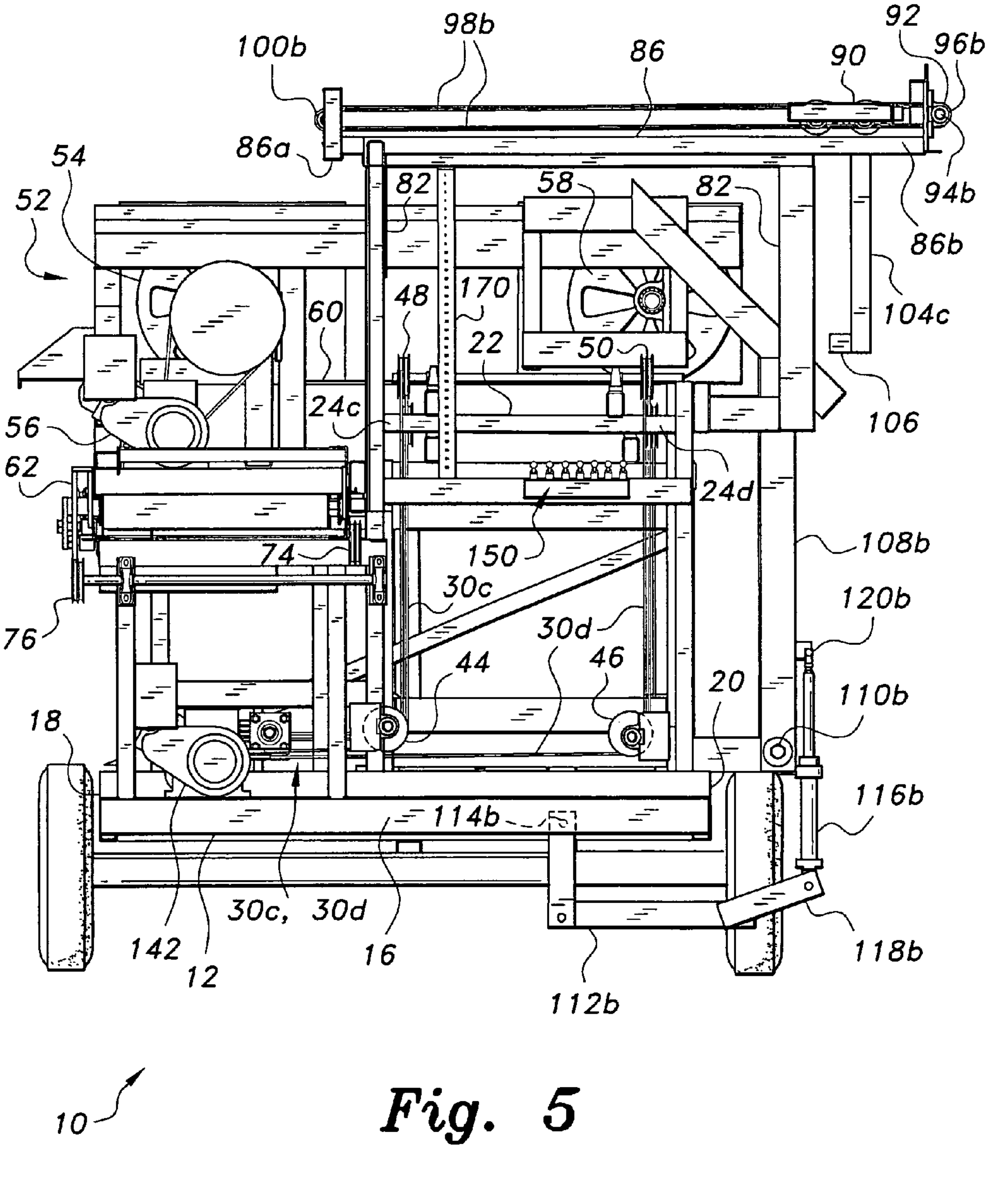
FIG. 5 is rear elevation view of the portable sawmill, showing further details thereof.
Figure 6:
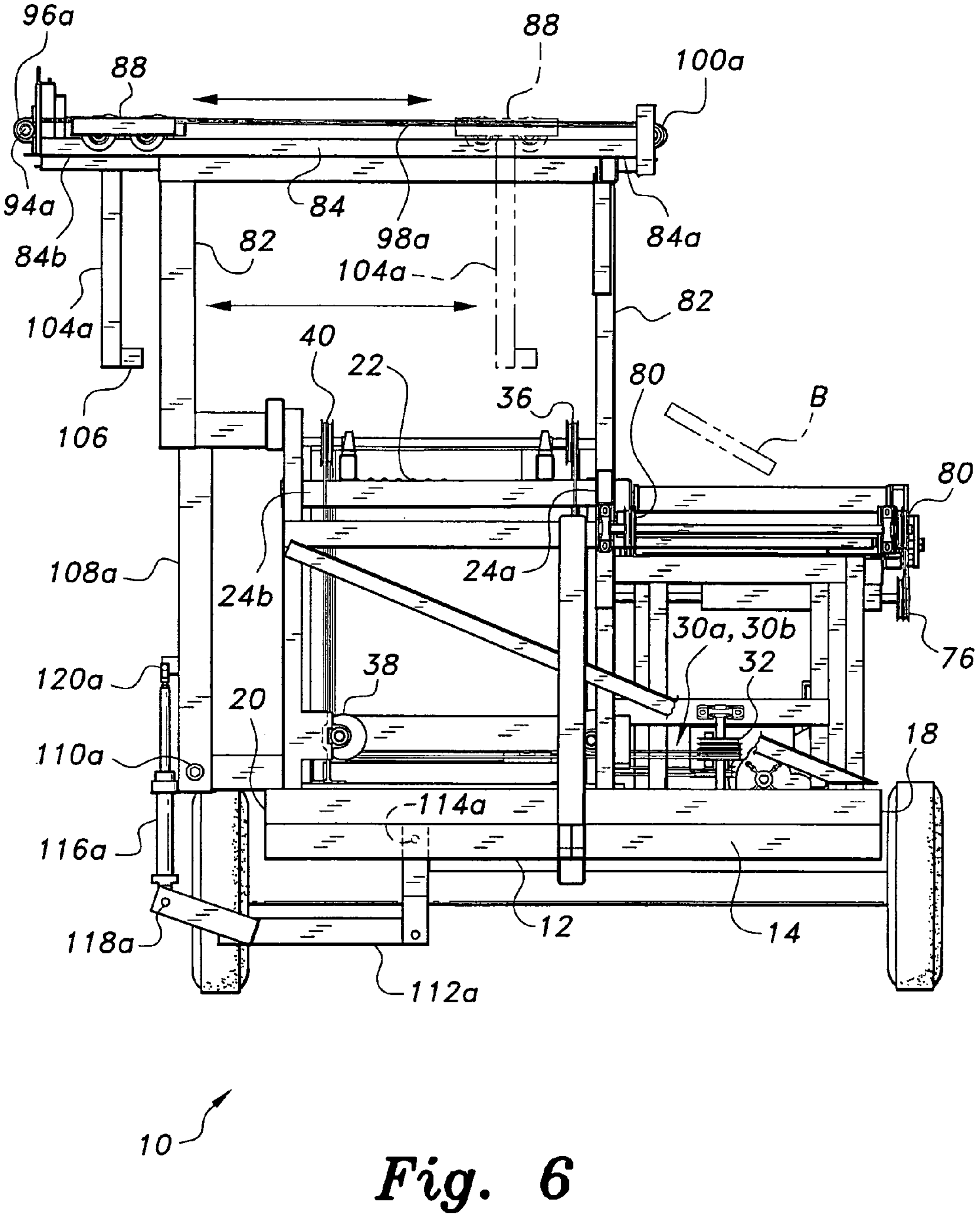
FIG. 6 is a front elevation view of the portable sawmill, showing the operation of the board sweep mechanism.
Figure 9:
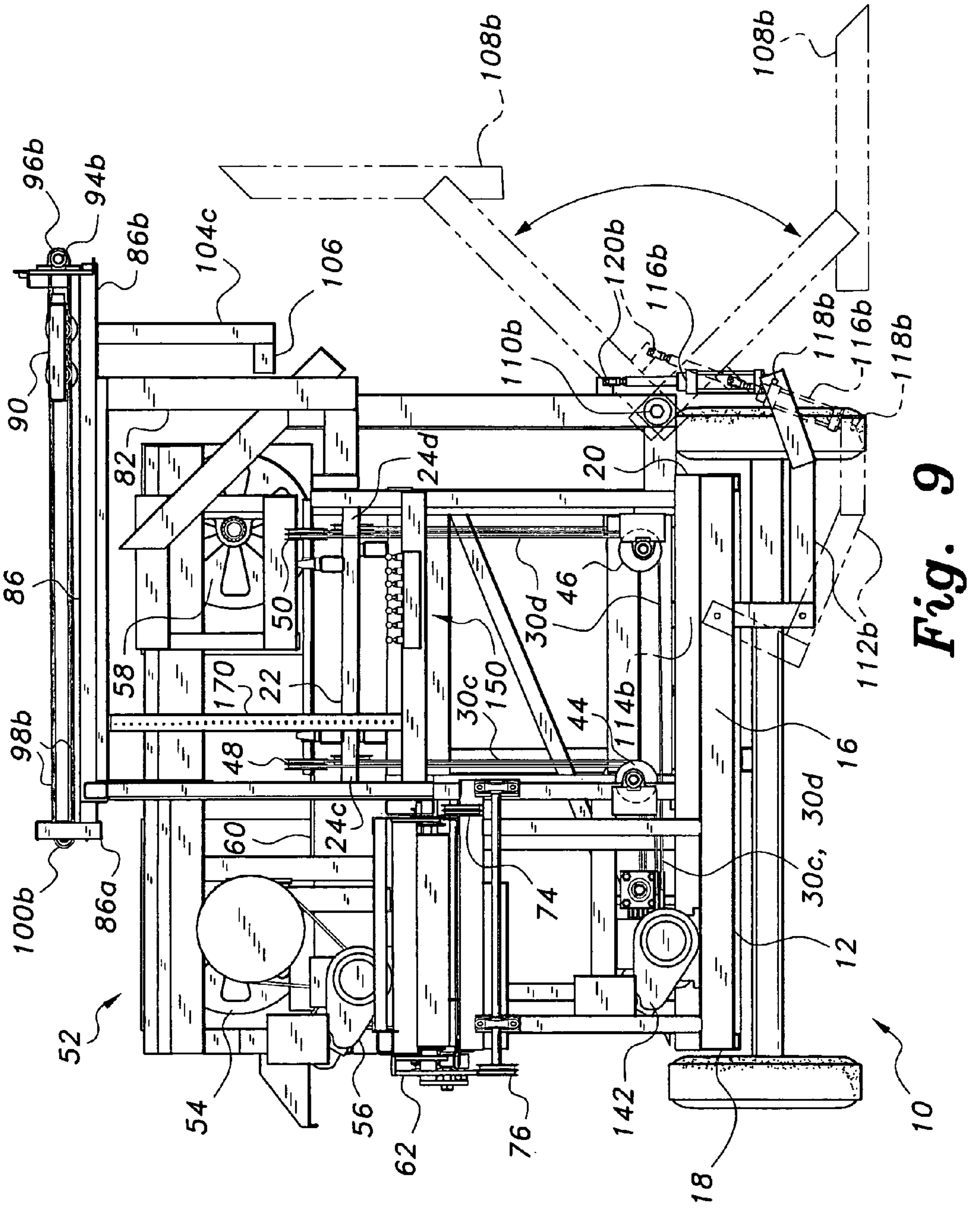
FIG. 9 is a rear elevation view of the portable sawmill, showing the log loading tines in their stowed position in solid lines and their deployed position in broken lines.

A log or other material resting atop the log deck is cut by a band saw assembly 52 that travels longitudinally along the length of the portable mill 10. The two rearward end views of FIGS. 5 and 9 illustrate the basic components of the band saw assembly 52. The band saw assembly 52 has a driven wheel 54 driven by a dedicated saw drive engine 56, an idler wheel 58, and an endless band saw blade 60 extending therearound. A conventional fuel tank and water or lubricant tank, not shown, may be mounted atop the band saw assembly 52 as needed. In addition, the saw may also include a blade tension adjuster and blade guide. The idler wheel 58 side and the central portion of the saw assembly 52, including the lower portion of the blade 60 extending between the two wheels 54, 58 is cantilevered over the vertically adjustable log deck 22, to cut logs or other materials resting thereon. The lower portion of the blade 60 extending between the two wheels 54, 58 defines a horizontal cutting plane due to the lower edges of the two wheels 54, 58 being level with one another and the saw assembly 52 traveling horizontally along the length of the portable mill 10.

As the log or other material being sawn is adjusted vertically to determine the relative location of the horizontal cutting plane therethrough, it is not necessary to raise and lower the saw for cutting operations. The saw assembly 52 is supported on a trolley 62 that is in turn supported upon a pair of opposed, parallel rails 64*a*, 64*b* that extend along the opposite lateral sides or edges of a board collection tray 66 that extends the length of the frame 12 over the left side thereof. The trolley 62 includes flanged wheels 68 that roll along the rails 64*a*, 64*b*, with the wheels resting on the first rail 64*a* being visible in various drawing Figs. Restraining rollers or guides 70 extend below the rails 64*a*, 64*b* along the edges of the tray 66, one of which is visible particularly in FIG. 3. Thus, the saw assembly 52 is captured along the horizontal collection tray 66, and cannot move or be adjusted vertically.

The saw assembly 52 is selectively driven along the length of the board collection tray 66 by a cable and pulley system that extends the length of the board collection tray 66. A reversible hydraulic motor 72 (shown schematically in the hydraulic circuit diagram of FIG. 12) drives the saw trolley 62 back and forth along the length of the board collection tray 66, or more particularly the length of the log deck 22, by means of a drive 74 incorporating one or more V-belts and pulleys. Alternatively, a roller chain and sprocket system may be used, as in other systems of the sawmill. The drive 74 turns a shaft with a drive pulley 76, with a saw trolley drive cable 78 wrapping around the pulley 76 and connecting to the saw trolley 62. An idler pulley 80 is located at the opposite end of the board collection tray 66 from the drive pulley 76, with the cable 78 continuing from the saw trolley 62, around the idler pulley 80, and back to the drive pulley 76. A duplicate drive system is preferably installed to the inboard side of the board collection tray 66, i.e., the drive pulley and idler pulley shafts each have two pulleys thereon, with a separate cable 78 extending around each pulley set just beneath each edge of the board collection tray. Roller chain and sprockets, or other suitable drive means, may be used in lieu of the pulley and cable system described above and shown in the drawings.

Figure 7:
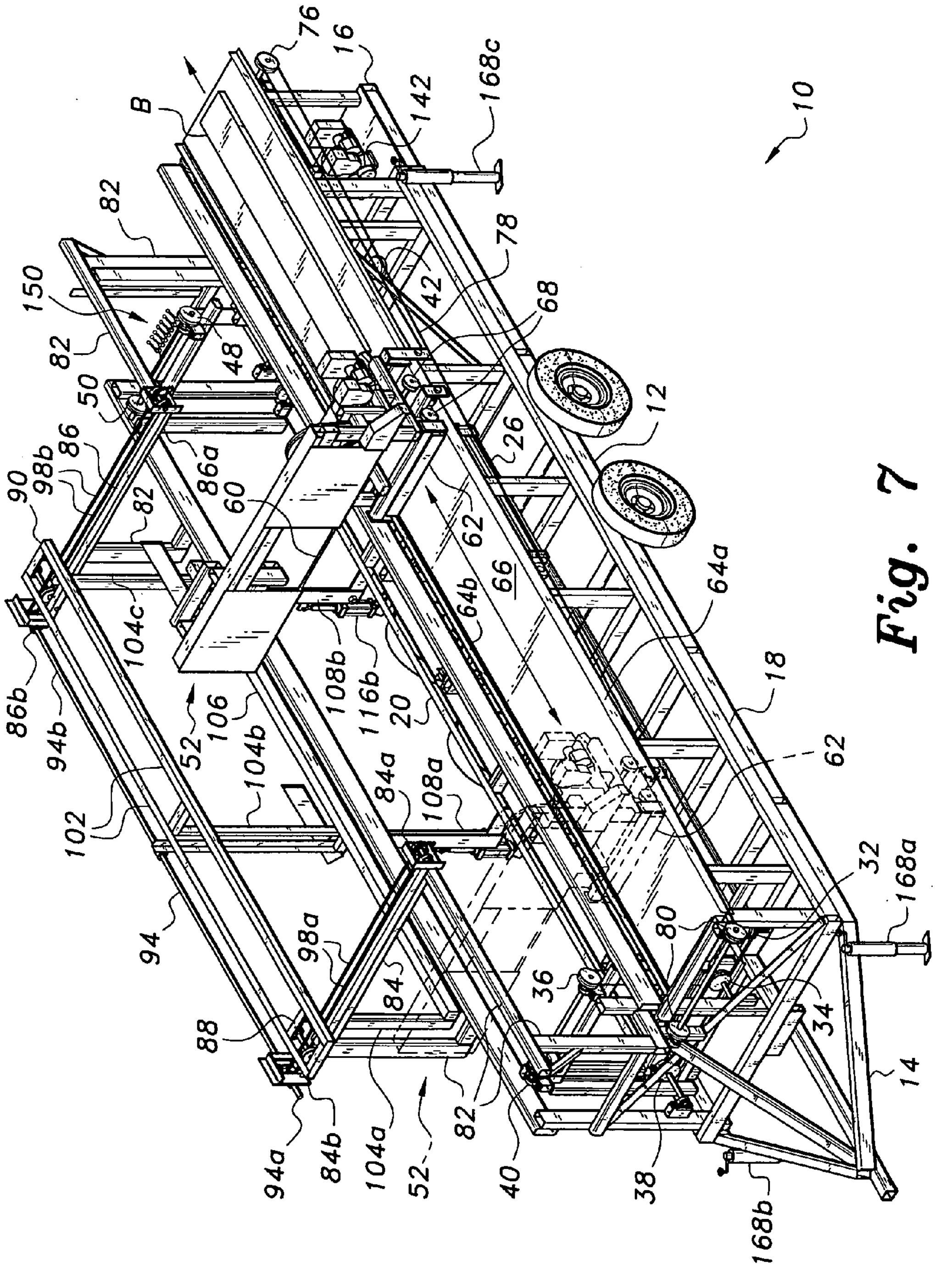
FIG. 7 is a left side, front and top perspective view of the portable sawmill, showing the longitudinal movement of the saw during cutting operations.

The hydraulic saw trolley drive motor 72 is reversible, as noted further above. This allows the mill operator to send the saw assembly 52 along the board collection tray 66 in a first or cutting direction, with the blade 60 making a horizontal cut through the log or material on the log deck 22. The cut board is then removed from the top of the log and onto the board collection tray 66 by a board sweep mechanism, discussed in detail below. At this point, the direction of saw travel is reversed and the saw is returned to its starting point for another cut, with the log being raised for the next cut by raising the log deck 22 upwardly by the desired amount corresponding to the thickness of the next board to be cut. As the saw travels from front to back along the mill 10 on its return (non-cutting) trip, the trolley 62 pushes the recently cut board B from the back of the board collection tray 66, generally as shown in FIG. 7 of the drawings, and onto or into a previously positioned collection area (trailer, pickup bed, etc.).

The board sweep includes a superstructure 82 extending upwardly from the right side, forward central, and rearward central areas of the trailer frame 12. The board sweep superstructure 82 further includes a forward or first board sweep track 84 and a rearward or second board sweep track 86, with the tracks 84 and 86 extending laterally across the frame 12 and above the band saw assembly 52. Each track has a first or left hand end and an opposite second or right hand end, the left ends being 84*a*, 86*a* for the two tracks 84 and 86 and the right ends being 84*b*, 86*b* for the two tracks. A board sweep trolley, respectively 88 and 90, is installed upon each of the tracks 84 and 86, with a hydraulic motor 92 mounted at the second or right hand end 86*b* of the second or rearward track 86. The motor 92 drives a rotary shaft 94, with the shaft 94 having opposite forward or first and rearward or second ends, respectively 94*a* and 94*b*, and extending between the second ends 84*b*, 86*b* of the two board sweep tracks 84 and 86. Each end of the shaft 94 includes a sprocket thereon, respectively 96*a* and 96*b*, with each sprocket having a board sweep trolley drive chain, respectively 98*a* and 98*b*, extending therearound and connecting to the respective board sweep trolley 88 and 90. An idler sprocket, respectively 100*a* and 100*b*, is installed at the opposite end of each track 84 and 86.

A trolley frame 102 extends between the two board sweep trolleys 88 and 90, and ties them rigidly together. A series of board sweep arms, respectively 104*a* through 104*c*, depends from the trolley frame 102, with a board sweep 106 extending across the lowermost ends of the sweep arms 104*a* through 104*c*. The board sweep 106 is disposed horizontally, i.e., parallel to and immediately above the saw cut plane, and extends longitudinally, parallel to the path of the saw 52 and board collection tray 66.

The board sweep mechanism is actuated after a board has been cut from the top of a log or other object resting upon the log deck 22, before moving the saw 52 back to its starting position toward the rear of the trailer frame 12. When the cut has been completed, the board sweep drive motor 92 is actuated to draw the trolleys 88 and 90 along their respective tracks and laterally across the structure by means of the rotary shaft 94, sprockets 96*a*, 96*b* and 100*a*, 100*b*, and their respective chains 98*a*, 98*b*. The trolleys 88, 90 and their affixed interconnecting frame 102 move transversely across the structure, thereby moving the sweep arms 104*a* through 104*c* and the horizontal board sweep 106 across the structure as well. As the lower edge of the board sweep 106 is at a height of only a small fraction of an inch above the horizontal cutting plane of the band saw blade 60, any cut board or other loose material atop the log is pushed laterally from the log over to the board collection tray 66. The board sweep mechanism is then moved back to its rest position above the right side 20 of the trailer frame 12 by reversing the hydraulic drive motor 92, and the saw 52 is returned to its start position. As the saw returns, the trolley pushes any cut material resting on the board collection tray 66 rearwardly and off the tray. The height of the log deck 22 is increased according to the desired thickness of the next board to be cut, and the saw 52 is again advanced to make another cut.

Figure 8:
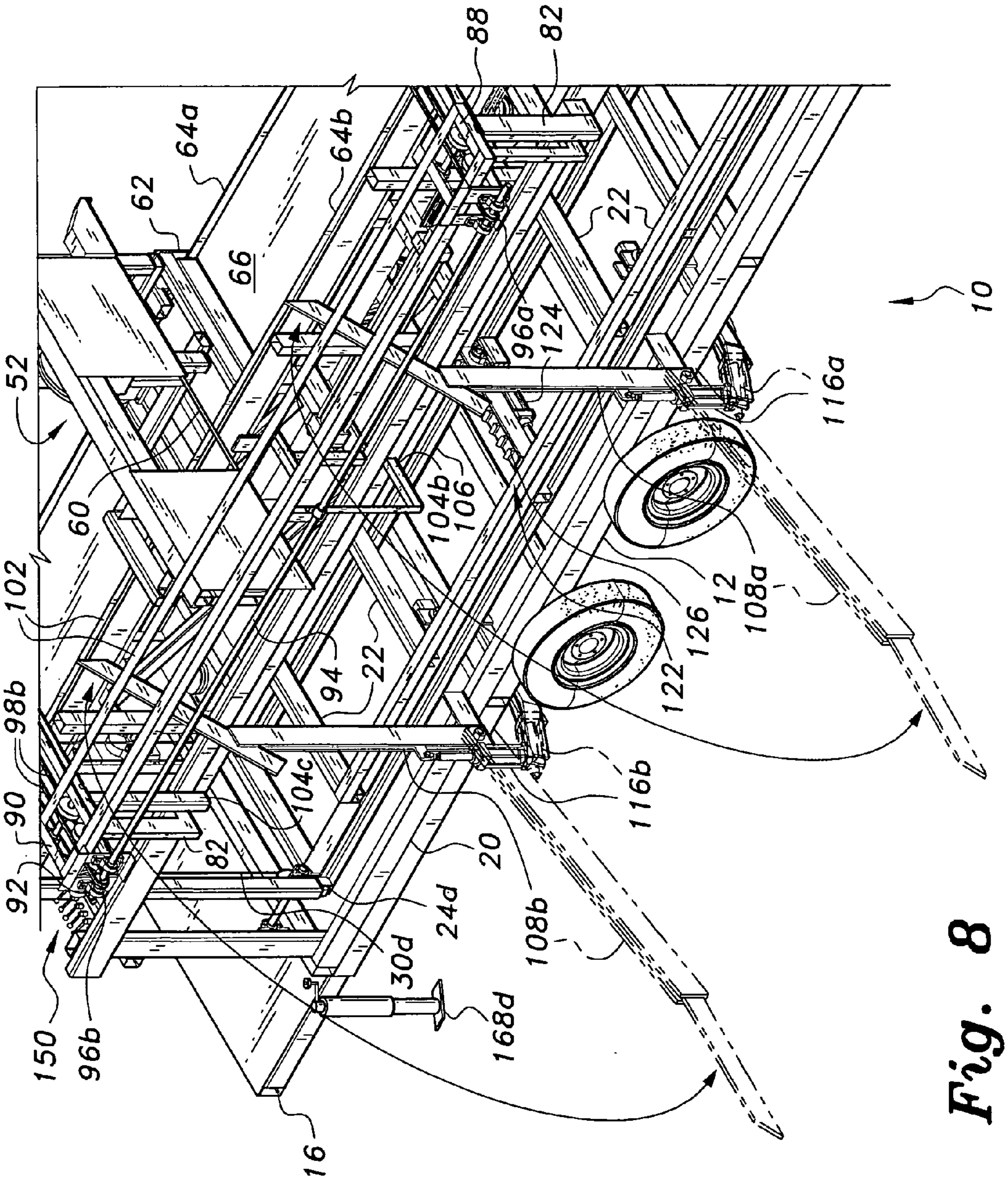
FIG. 8 is a right side perspective view of the portable sawmill, showing the operation of the log loading tines or arms.

The portable sawmill 10 further includes powered means for loading a log onto the log deck 22, thereby further easing the physical workload of the mill operator and reducing the need for additional personnel. A pair of log lift tines 108*a* and 108*b* pivotally extend from the second or right side 20 of the frame 12, and are hydraulically actuated to lift a log or other heavy object from the ground beside the portable sawmill 10 and onto the log deck 22. The articulating links attaching each tine to the trailer frame 12 are configured to rest upon the underlying surface when the tines are in use, thus relieving the trailer frame 12 of the load and force imparted to the log lift tine structure when a log is lifted. This mechanism is best shown in FIGS. 8 and 9 of the drawings.

Each tine 108*a*, 108*b* is pivotally attached to the second or right side 20 of the frame 12 at a respective pivot point 110*a* and 110*b*, i.e., a heavy bolt, pin, etc. Two log lift tine linkages 112*a*, 112*b* are pivotally attached beneath the trailer frame 12, with each extending from a respective linkage attachment point 114*a*, 114*b* on the frame 12. A hydraulic tine lift strut, respectively 116*a*, 116*b*, is pivotally attached to the distal end of each of the log lift tine linkages 112*a*, 112*b* at a hydraulic strut mounting point 118*a*, 118*b*, with the opposite end of each strut pivotally attached to a point, respectively 120*a*, 120*b*, on its respective log lift tine 108*a*, 108*b*. A mechanical or hydraulic leveling or equalizing system may be installed between the two tines 108*a*, 108*b* or lift struts 116*a*, 116*b* to keep the two tines level when more weight is being carried by one tine than the other.

When the log lift tine mechanism is not in use, the two tines 108*a*, 108*b* are folded upwardly against the right side of the structure. This not only reduces the overall width of the portable sawmill 10 to allow towing on the road without need for special permits, but also raises the two log lift tine links 112*a*, 112*b* clear of the underlying surface. When the log lift tine mechanism is to be used, the tines 108*a*, 108*b* are released from their latched positions and lowered to the surface. This results in the two tine links dropping from their raised positions adjacent the underside of the frame 12, to rest upon the underlying surface. As a result, when the two log tine lift struts 116*a*, 116*b* are actuated to lift the tines (and any load thereon), the outer or distal ends of the two links 112*a*, 112*b* with their hydraulic strut attach points 118*a*, 118*b* are resting on the underlying surface, with the hydraulic struts essentially compressed and working against the underlying surface, rather than against some fixed structure on the portable mill 10. The result is that there is considerably less force imparted to the portable mill frame 12, with correspondingly less stress, strain, and potential damage to the structure.

Once the log has been loaded onto the log deck 22 using the log lift tine mechanism described above, the log must be positioned as desired (turned, etc.) on the log deck, and locked in place to prevent movement of the log during the cutting operation. The log turning and manipulating operation is accomplished by a log turning strut 122 disposed laterally in the floor of the log deck 22, as shown best in FIGS. 8, 10, and 11 of the drawings. The log turning strut 122 is pivotally mounted in the log deck, and is selectively raised and lowered angularly by a log strut lift hydraulic cylinder 124. The strut 122 further includes an axially extendible telescoping log turning rack 126, with the rack 126 being actuated by a rack extension hydraulic cylinder 128 disposed within the log turning strut 122. The rack 126 includes a series of teeth thereon to grip the surface of the log and rotate the log on the log deck 22 by extending the rack 126.

Figure 10:
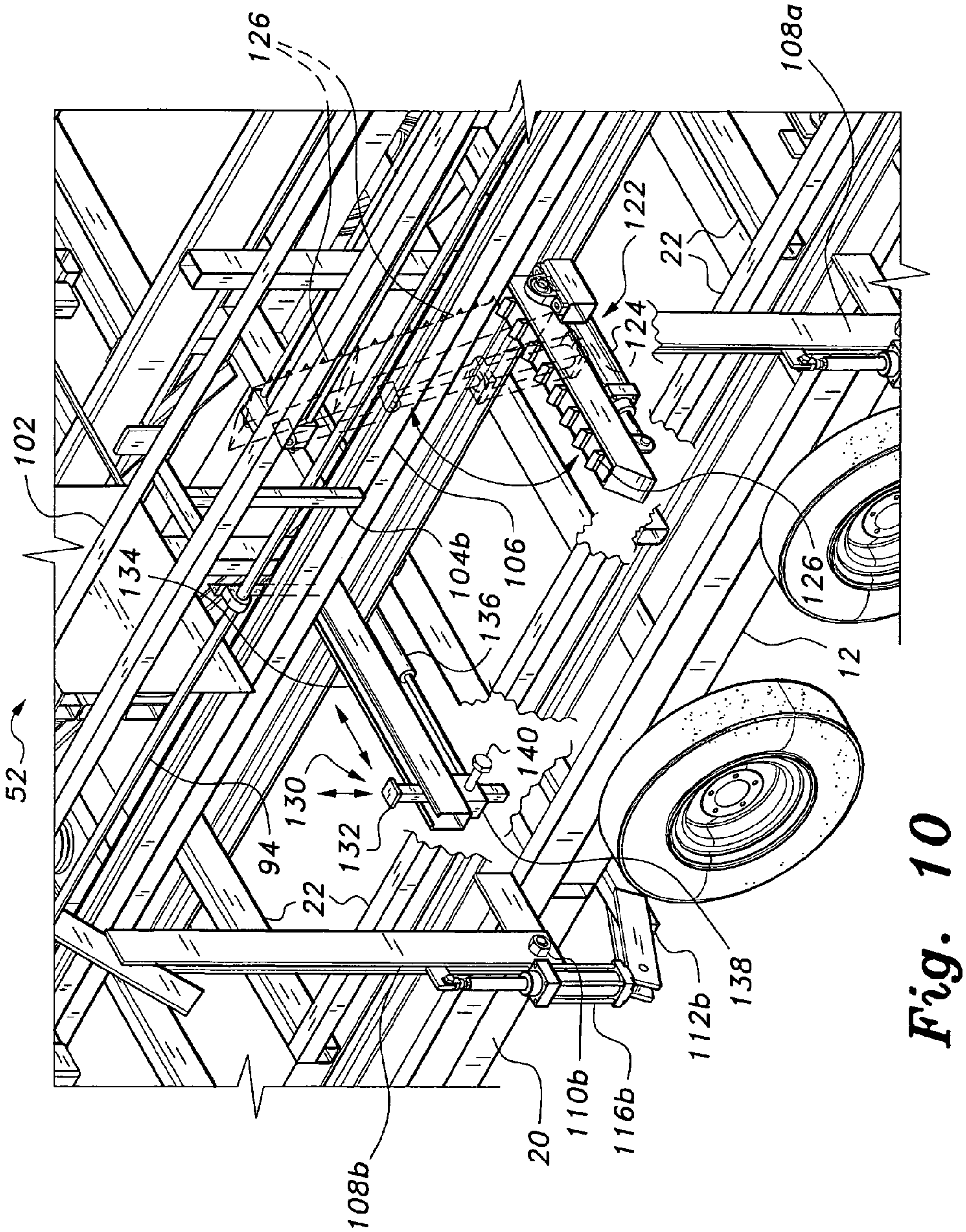
FIG. 10 is a detailed right side perspective view of the portable sawmill showing the log turning and grip mechanisms, with overlying structure removed for clarity.
Figure 11:
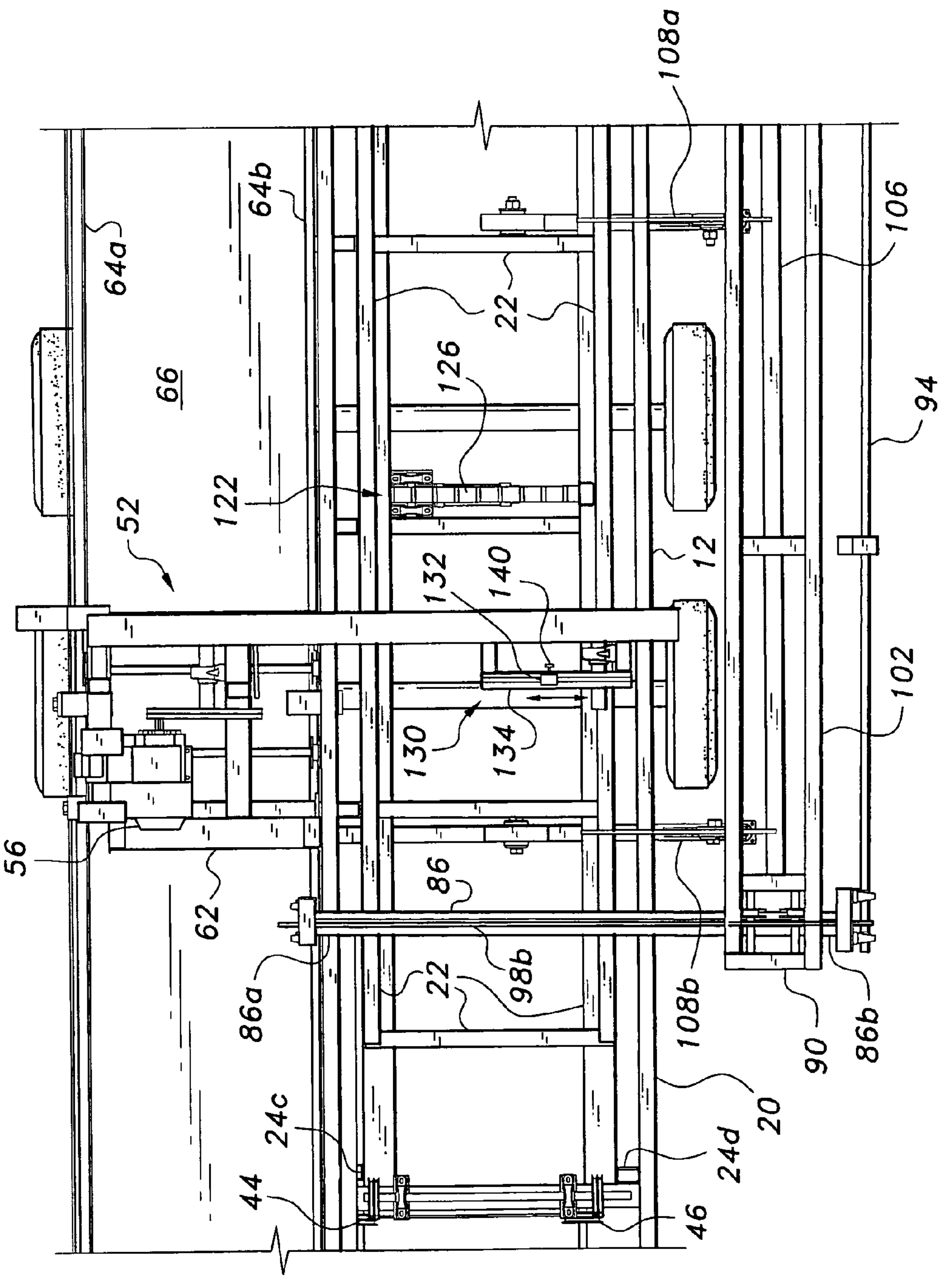
FIG. 11 is a top plan view of the portable sawmill, showing further details of the log turning and grip mechanisms.

Once the log has been rotated or manipulated into position as desired, the log turning strut 122 is retracted and the log is locked in place by a hydraulically actuated log grip mechanism 130, shown in FIGS. 10 and 11. The log grip mechanism 130 is also installed within the log deck 22, with a vertically adjustable log grip finger 132 extending upwardly therefrom. The log grip mechanism 130 comprises a slotted member 134, in which the log grip finger slides. A hydraulic strut or cylinder 136 is selectively actuated to slide the log grip finger 134 inwardly or outwardly, i.e., toward or away from the log resting on the log deck 22. Alternatively, a hydraulically powered motor may be used to rotate a jackscrew to advance and retract the finger 134, if so desired. The cylinder 136 is connected to a sleeve 138, with the log grip finger 132 being vertically adjustable within the sleeve 138 to adjust for different log diameters. The height of the finger 132 is set by a locking bolt 140 extending through the wall of the sleeve 138 to bear against the finger 132 and lock it in place as desired.

Figure 12:
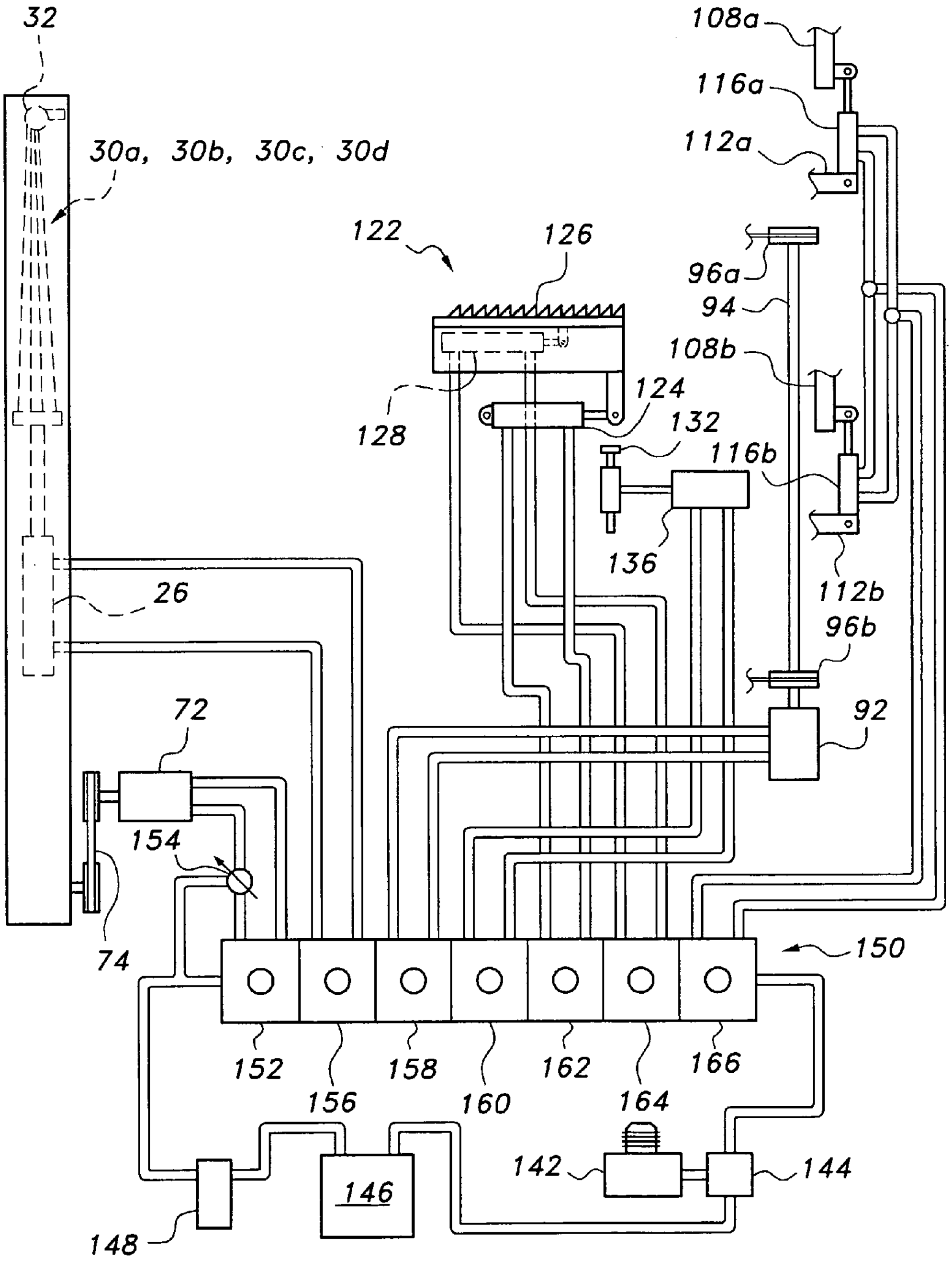
FIG. 12 is a schematic drawing of the hydraulic system used to operate the portable sawmill.

FIG. 12 of the drawings provides a general schematic for the hydraulic system powering the various components of the portable sawmill 10. Many of these components are illustrated in a more pictorial format in various other drawing FIGS. The hydraulic system is powered by an engine 142 that drives a hydraulic pump 144 to provide hydraulic pressure and flow to the various hydraulic components. This hydraulic power engine 142 is separate from the engine 56 that powers the saw blade 60, as is clearly shown in FIGS. 1, 5, 7, and 9. Hydraulic fluid is drawn from a reservoir 146, with fluid passing through a filter 148 prior to returning to the reservoir. The engine 142, pump 144, and/or the reservoir 146 and filter 148 may be provided as a unitary power pack, if so desired.

A hydraulic control manifold 150 is located at an operator station toward the rear of the sawmill 10, as shown in FIGS. 1, 2, 5, 7, 8, and 9 and schematically in FIG. 12, and receives and distributes hydraulic fluid under pressure to the various hydraulic systems of the sawmill 10. The first hydraulic control 152 of the manifold 150, i.e., the control farthest to the left in FIG. 12, is a double acting valve controlling hydraulic pressure and flow to the reversible saw trolley drive motor 72, for driving the saw assembly 52 back and forth over the board collection tray 66. Operation of the control valve 152 in one direction drives the saw 52 toward the front of the sawmill 10, i.e., in a cutting direction, while operation of the valve 152 in the opposite direction returns the saw to reposition it for another cut. The saw return also pushes any cut material from the collection tray 66, as described further above. A variable valve 154 may be included in this hydraulic circuit to control the speed of the saw assembly 52 as it advances and retreats along the collection tray.

The second hydraulic control valve 156 controls hydraulic pressure and flow to the log lift deck cylinder 26. This cylinder retracts under pressure, drawing the various log lift deck cables 30*a* through 30*d* toward the cylinder to lift the log deck 22, as described in detail further above and shown in various drawing FIGS.

The third hydraulic control valve 158 provides hydraulic pressure and fluid for the board sweep motor 92. This is another reversible valve and motor, with valve actuation in one direction causing the motor 92 to turn the shaft 94 and associated sprockets and chains to move the log sweep 106 from its rest position to sweep a cut board from the top of the log and onto the board collection tray 66, while operation of the valve 158 in the opposite direction returns the board sweep 106 to its rest position.

The fourth hydraulic control valve 160 controls the hydraulic cylinder 136 (or alternatively, a hydraulic motor driving a jackscrew) for the log grip mechanism 130, shown in FIGS. 10 and 11. This is another double acting valve and cylinder, to apply pressure to the log grip finger 132 and to withdraw the finger 132 to release the log as desired.

The fifth hydraulic control valve 162 operates the log strut lift cylinder 124 of the log turning strut 122. This cylinder tilts the log turning strut 122 so that its toothed log turning rack 126 will bear against the side of a log resting atop the log deck 22, with operation of the sixth valve 164 telescoping the rack 126 from its strut 122 to rotate the log on the log deck 22.

The sixth hydraulic control valve 164 controls the telescoping action of the log turning rack 126 of the log turning strut 122 via its cylinder 128. This mechanism 122 is illustrated in FIGS. 8, 10, and 11, and schematically in FIG. 12. This is another double acting valve and cylinder.

The seventh hydraulic control valve 166 controls hydraulic power to the two log lift tine cylinders or struts 116*a* and 116*b*, to raise and lower the corresponding tines 108*a*, 108*b* as desired. The tines 108*a*, 108*b* are deployed by unlatching them from the sawmill structure and retracting the cylinders 116*a*, 116*b* to allow them to rest upon the underlying surface. A log is then placed upon the two tines 108*a*, 108*b* (e.g., rolled, delivered with a fork lift, etc.), and the tines are lifted by extending the cylinders 116*a*, 116*b* in accordance with operation of the seventh valve 166. This rolls the log onto the log deck 22 for sawing operations.

In addition to the above seven hydraulic controls, an optional eighth system (not shown) may be provided to assist in removing cut materials from the board collection tray 66 and onto the adjacent truck bed, trailer, or other receiver. A hydraulically powered roller may be installed at the rearward end of the tray 66, adjacent the saw trolley drive pulley 76 and its shaft. A hydraulic motor may be provided to drive this roller. The roller drive motor may be controlled by the optional eighth hydraulic control and receive hydraulic power from the hydraulic system described further above.

The portable sawmill 10 may be towed to any practicable location for sawing operations. The sawmill 10 is configured as a trailer with wheels and a forward tongue (the conventional hitch is not shown) for towing behind a suitable vehicle for relocation as desired. Once the sawmill 10 has been positioned as desired, it is leveled by means of the four leveling jacks 168*a* through 168*d* located near the four corners of the frame 12. These jacks may be mechanical screw type jacks, or hydraulically powered, if so desired. Each of the jacks 168*a* through 168*d* is pivotally mounted to the frame 12, and may be swung or pivoted to a horizontal position to avoid ground contact when the trailer is underway.

Once the portable sawmill 10 has been set up and leveled, the two log lift tines 108*a*, 108*b* are released from their stowed positions against the side of the trailer frame 12, and the links 112*a*, 112*b* are lowered to rest upon the ground. The hydraulic pump engine 142 and band saw engine 56 are started, and the mill 10 is ready for operation.

Initially, the saw assembly 52 is positioned at the rearward end 16 of the mill, i.e., in position for beginning a first cut, using the first hydraulic control 152. A log is positioned across the two lowered log lift tines 108*a* and 108*b*, and the hydraulic control 166 is actuated to raise the tines and roll the log onto the log lift deck 22. The log is positioned as desired on the deck 22 by means of the telescoping log turning strut 122 operated by its controls 164 (for raising the strut 122) and 162 (for telescoping or extending the toothed extension rack 126). Once the log has been positioned as desired, it is locked and held in position by the log grip finger 132, actuated by the hydraulic control 160. The extension rack 126 is retracted, and the log turning strut 122 is lowered below the surface of the log deck 22 using the appropriate hydraulic controls.

At this point, the log lift deck is raised by means of the hydraulic control 156 to position the top of the log as desired for a first cut. The height or depth of the first cut is not dimensionally critical, as it is intended only to produce a level cut surface and remove a portion of the irregular outer surface of the log. The saw assembly 52, with its previously started saw blade drive engine 56, is advanced to make the first cut by using the first hydraulic control 152. Once this has been accomplished, the board sweep 106 is actuated by the control 158 to remove the cut material to the board collection tray 66, and the saw assembly is returned to its starting position at the rear of the trailer frame 12 by reversing the control 152. The saw trolley or carriage 62 pushes the cut material from the collection tray 66, with the return of the saw assembly 52 to its start position serving to ready the saw for another cut and simultaneously clearing the board collection tray 66.

The log may be turned through 90 degrees to position its freshly cut flat side against the longitudinal member of the frame adjacent to the interior side of the log lift deck 22 and locked in place by means of the appropriate controls 162, 164, and 160, as explained further above, in order to trim the irregular outer surfaces from the log. Once this has been accomplished and it is possible to cut uniform boards having constant thickness from the log, the log deck 22 is raised as desired using the control 156 to provide the desired board thickness. The log deck height is determined by a fixed vertical scale 170 located at the rearward end of the frame 12 adjacent the hydraulic control manifold 150, most clearly seen in FIGS. 5 and 9 of the drawings. An indicator or pointer, not shown, is affixed to the vertically adjustable log lifting deck 22, with the pointer indicating on the scale 170 the depth or thickness of the cut to be made.

The board cutting process continues as described above using the various hydraulic controls, with little or no strenuous labor being required by the operator. An additional log may be loaded onto the log deck 22 as described further above when the first log has been completely cut, with the cutting operation continuing as described above. It will be seen that once the portable sawmill 10 has been positioned and leveled and the engines 56 and 142 started, the only control not operated by the controls at the hydraulic manifold 150 and requiring adjustment by the operator is the lock bolt 140 for holding the height of the log gripping finger 132 (FIG. 10). Thus, the portable sawmill 10 may be easily operated by a single operator, without need for assistance. A seat (not shown) may be installed at the operator's hydraulic control manifold 150 for greater operator comfort, if so desired.

Once the logging operation has been completed, the band saw drive engine 56 and hydraulic pump drive engine 142 are shut down, the four leveling jacks 168*a* through 168*c* are raised and rotated for stowing against the sides of the frame 12, and the sawmill 10 connected to a tow vehicle and moved to the next operational site or for storage, as the case may be. All of this is easily accomplished by a single operator, thus providing considerable dependability and economy of operation for the owner or operator, as he no longer has to be concerned about the reliability of his help or the need to pay such help. Moreover, the ease of performing nearly all operations from the control manifold 150 situated at the operator platform at the end of the sawmill frame 12 allows considerably greater efficiency for the operator as he is not required to leave the operating station to perform other operations, other than the very infrequent adjustment of the height of the log grip finger. The result is an extremely efficient machine that will provide great economy of operation and returns for the owner and/or operator.

It is to be understood that the present invention is not limited to the embodiment described above, but encompasses any and all embodiments within the scope of the following claims.

I claim:

1. A portable sawmill, comprising:

a frame having a first end, a second end opposite the first end, a first side, and a second side opposite the first side;

a vertically adjustable log deck disposed upon the frame;

means for adjusting the height of the log deck relative to the frame;

a band saw track immovably affixed to the frame between the first end and the second end thereof; and a band saw secured to the track, the band saw having a blade, the band saw selectively traveling longitudinally over the log deck along the track, the track precluding vertical motion of the band saw, wherein the band saw blade defines a substantially horizontal cut plane, the portable sawmill further comprising a board sweep extending from the frame, the board sweep selectively sweeping laterally across the frame immediately above the cut plane defined by the blade of the band saw.

2. The portable sawmill according to claim 1, wherein the band saw track has mutually opposed and parallel first and second rails, the portable sawmill further comprising a board collection tray disposed between the rails, the board collection tray separating the first and second rails from one another, the band saw being secured to the rails, the band saw selectively traveling longitudinally along the rails and pushing material from the board collection tray.

3. The portable sawmill according to claim 1, further comprising:

a plurality of log lift tines pivotally extending from the second side of the frame;

a plurality of log lift tine links pivotally depending from the frame and corresponding in number to the plurality of log lift tines; and a tine lift strut adjustably connecting each of the logs lift tine links with a corresponding one of the log lift tines.

4. The portable sawmill according to claim 1, further comprising:

a band saw engine selectively driving the band saw blade; and a hydraulic apparatus disposed upon the frame, the hydraulic apparatus including a hydraulic pump, a hydraulic power engine separate from the band saw engine, and a hydraulic control system.

5. The portable sawmill according to claim 4, wherein the log lift deck has at least a generally rectangular platform with first through fourth corners, the portable sawmill further comprising:

a log lift deck hydraulic strut communicating hydraulically with the hydraulic pump and control system; and first through fourth log lift deck cables extending from the log lift deck strut respectively to the first through fourth corners of the log lift deck, the cables selectively lifting and lowering the log lift deck in accordance with the hydraulic control system.

6. The portable sawmill according to claim 4, further comprising:

first and second board sweep tracks extending laterally over the frame, each of the tracks having a first end and a second end opposite the first end;

a rotary board sweep shaft extending between the second ends of the board sweep tracks;

a board sweep hydraulic motor communicating hydraulically with the hydraulic pump and control system, the motor selectively driving the board sweep shaft;

first and second board sweep trolleys disposed respectively upon the first and second board sweep tracks, the board sweep trolleys being driven by the board sweep shaft; and a board sweep extending between the board sweep trolleys, the board sweep selectively sweeping laterally across the frame in accordance with the hydraulic control system.

7. The portable sawmill according to claim 4, further comprising:

a hydraulically actuated log turning stmt disposed laterally across and pivotally extending from the log deck; and a hydraulically actuated log turning rack telescopically extending from the log turning strut.

8. The portable sawmill according to claim 4, further comprising a hydraulically actuated log grip disposed within the log deck, the log grip adjustably extending therefrom.

9. A portable sawmill, comprising:

a frame having a first end, a second end opposite the first end, a first side, and a second side opposite the first side;

mutually opposed and parallel first and second band saw rails disposed between the first end and the second end of the frame;

a board collection tray disposed between the rails, the tray separating the first and second rails from one another; and a band saw secured to the rails, the band saw having a blade, the band saw selectively traveling longitudinally along the rails and pushing material from the board collection tray, wherein the band saw blade defines a substantially horizontal cut plane, the portable sawmill further comprising a board sweep extending from the frame, the board sweep selectively sweeping laterally across the frame immediately above the cut plane defined by the blade of the band saw.

10. The portable sawmill according to claim 9, wherein the band saw track is immovably affixed to the frame, the track precluding vertical motion of the band saw, the portable sawmill further comprising:

a vertically adjustable log deck disposed upon the frame; and means for adjusting the height of the log deck relative to the frame.

11. The portable sawmill according to claim 9, further comprising:

a plurality of log lift tines pivotally extending from the second side of the frame;

a plurality of log lift tine links pivotally depending from the frame and corresponding in number to the plurality of log lift tines; and a tine lift strut adjustably connecting each of the log lift tine links with a corresponding one of the log lift tines.

12. The portable sawmill according to claim 9, further comprising:

a band saw engine selectively driving the band saw blade; and a hydraulic apparatus disposed upon the frame, the hydraulic apparatus including a hydraulic pump, a hydraulic power engine separate from the band saw engine, and a hydraulic control system.

13. The portable sawmill according to claim 12, further comprising:

a vertically adjustable log deck disposed upon the frame, the log deck having a generally rectangular platform defining first through fourth corners;

a log lift deck hydraulic strut communicating hydraulically with the hydraulic pump and control system; and first through fourth log lift deck cables extending from the log lift deck strut respectively to the first through fourth corners of the log lift deck, the cables selectively lifting and lowering the log lift deck in accordance with the hydraulic control system.

14. The portable sawmill according to claim 12, further comprising:

first and second board sweep tracks extending laterally over the frame, each of the tracks having a first end and a second end opposite the first end;

a rotary board sweep shaft extending between the second ends of the board sweep tracks;

a board sweep hydraulic motor communicating hydraulically with the hydraulic pump and control system, the motor selectively driving the board sweep shaft;

first and second board sweep trolleys disposed respectively upon the first and second board sweep tracks, the board sweep trolleys driven by the board sweep shaft; and a board sweep extending between the board sweep trolleys, the board sweep selectively sweeping laterally across the frame in accordance with the hydraulic control system.

15. The portable sawmill according to claim 12, further comprising:

a log deck disposed upon the frame;

a hydraulically actuated log turning strut disposed laterally across and pivotally extending from the log deck; and a hydraulically actuated log turning rack telescopically extending from the log turning strut.

16. The portable sawmill according to claim 12, further comprising:

a log deck disposed upon the frame; and a hydraulically actuated log grip disposed within the log deck, the log grip adjustably extending therefrom.

17. A portable sawmill, comprising:

a frame having a first end, a second end opposite the first end, a first side, and a second side opposite the first side;

a band saw track disposed between the first end and the second end of the frame;

a band saw secured to the track, the band saw having a blade, the band saw selectively traveling longitudinally along the track;

a plurality of log lift tines pivotally extending from the second side of the frame;

a plurality of log lift tine links pivotally depending from the frame and corresponding in number to the plurality of log lift tines;

a tine lift strut adjustably connecting each of the log lift tine links with a corresponding one of the log lift tines;

the band saw has a blade defining a substantially horizontal cut plane; and a board sweep extends from the frame, the board sweep selectively sweeping laterally across the frame immediately above the cut plane defined by the blade of the band saw.

18. The portable sawmill according to claim 17, wherein the band saw track is immovably affixed to the frame, the track precluding vertical motion of the band saw, the portable sawmill further comprising:

a vertically adjustable log deck disposed upon the frame; and means for adjusting the height of the log deck relative to the frame.

19. The portable sawmill according to claim 17, wherein the band saw track has mutually opposed and parallel first and second rails, the portable sawmill further comprising a board collection tray disposed between the rails, the board collection tray separating the first and second rails from one another, the band saw being secured to the rails, the band saw selectively traveling longitudinally along the rails and pushing material from the board collection tray.

20. The portable sawmill according to claim 17, further comprising:

a band saw engine selectively driving the band saw blade; and a hydraulic apparatus disposed upon the frame, the hydraulic apparatus including a hydraulic pump, a hydraulic power engine separate from the band saw engine, and a hydraulic control system.

21. The portable sawmill according to claim 20, further comprising:

a vertically adjustable log deck disposed upon the frame, the log deck being a generally rectangular platform defining first through fourth corners;

a log lift deck hydraulic strut communicating hydraulically with the hydraulic pump and control system; and first through fourth log lift deck cables extending from the log lift deck strut respectively to the first through fourth corners of the log lift deck, the cables selectively lifting and lowering the log lift deck in accordance with the hydraulic control system.

22. The portable sawmill according to claim 20, further comprising:

first and second board sweep tracks extending laterally over the frame, each of the tracks having a first end and a second end opposite the first end;

a rotary board sweep shaft extending between the second ends of the board sweep tracks;

a board sweep hydraulic motor communicating hydraulically with the hydraulic pump and control system, the motor selectively driving the board sweep shaft;

first and second board sweep trolleys disposed respectively upon the first and second board sweep tracks, the board sweep trolleys driven by the board sweep shaft; and a board sweep extending between the board sweep trolleys, the board sweep selectively sweeping laterally across the frame in accordance with the hydraulic control system.

23. The portable sawmill according to claim 20, further comprising:

a log deck disposed upon the frame;

a hydraulically actuated log turning strut disposed laterally across and pivotally extending from the log deck; and a hydraulically actuated log turning rack telescopically extending from the log turning strut.

24. The portable sawmill according to claim 20, further comprising:

a log deck disposed upon the frame; and a hydraulically actuated log grip disposed within the log deck, the log grip adjustably extending therefrom.

* * * * *